United States Patent

Owen, Jr.

[15] 3,658,199

[45] Apr. 25, 1972

[54] REFUSE CART AND DUMPING APPARATUS

[72] Inventor: Thomas G. Owen, Jr., R.R. #7, P.O. Box 250, Bloomington, Ind. 47401

[22] Filed: Mar. 30, 1970

[21] Appl. No.: 23,916

[52] U.S. Cl. ............................................214/318, 214/302
[51] Int. Cl. ..............................................................B65f 3/04
[58] Field of Search ..................................214/302, 303, 318

[56] References Cited

UNITED STATES PATENTS

| | | | |
|---|---|---|---|
| 2,949,199 | 8/1960 | Jones | 214/302 |
| 3,063,586 | 11/1962 | Appleman | 214/302 |

Primary Examiner—Gerald M. Forlenza
Assistant Examiner—Lawrence J. Oresky
Attorney—Woodard, Weikart, Emhardt & Naughton

[57] ABSTRACT

A dumping apparatus for lifting a refuse cart so as to cause the contents to fall from the cart. The dumping apparatus has two claw-like hands mounted to arms which are fixedly fastened to a shaft rotatably mounted in two vertical members. A sprocket attached to the end of the shaft is driven causing the two hands to automatically engage and lift cylindrical rods fastened to either side of the refuse cart. Projections are fastened to the forward wall of the cart and engage the cylindrical shaft causing the cart to rotate as it is being lifted. A bumper bar is fastened to the two vertical members forcing the two rods fastened to the cart wall to disengage from the inner cylindrical portion of the claw-like hands as the cart is placed back in a horizontal position.

6 Claims, 5 Drawing Figures

INVENTOR.
THOMAS G. OWEN JR.
BY
Woodard, Weikart, Emhardt & Naughton
ATTORNEYS

Patented April 25, 1972

INVENTOR.
THOMAS G. OWEN JR.
BY
Woodard, Weikart, Emhardt & Naughton
ATTORNEYS

REFUSE CART AND DUMPING APPARATUS

BACKGROUND OF THE INVENTION

1. Field of the Invention

This invention relates to material handling device for lifting and dumping a container.

2. Description of the Prior Art

At least three U.S. patents have been issued for devices for handling material in such a manner so as to cause the material to fall from the container. The U.S. Pat. to Van Hellen, No. 2,860,798 shows a large tractor vehicle, the type typically utilized in the construction of roads and highways, for dumping material onto the ground. The U.S. Pat. to Troller No. 3,206,051, shows a trash cart having a self-contained dumping device, both of which may be carried to the dumping site by a crane hook or a vehicle such as a forklift truck. The U.S. Pat. to Gollnick, No. 2,928,562, shows a dumping device attached to the back of a truck for lifting a trash cart with cables manually attached to the cart. The cables are driven in such a manner so as to cause the contents of the cart to dump into the truck. Subsequent to the dumping operation, the cables must be manually disconnected from the cart.

There is a need for an automatic dumping apparatus which will lift a cart in such a manner so as to cause the contents of the cart to be dumped. The apparatus should not require any connections to be made manually, such as the manual connection of arms, levers, or cables and should be fully automatic.

SUMMARY OF THE INVENTION

In the illustrated embodiment of the invention which is selected only to show one possible example, a dumping device having two claw-like hands attached to arms fixedly mounted to a shaft automatically engage two cylindrical handle rods fastened to the sidewalls of a trash cart. The hands lift the cart in such a manner so as to cause the contents to fall from the cart. The shaft is rotatably mounted to two vertical members having a sprocket fixedly fastened to one end of the shaft. The sprocket is rotated by a chain sprocket mechanism. Four projections are fastened to the wall nearest the dumping device for straddling the cylindrical shaft so as to cause the cart to tilt as the hands lift the cart. A bumper bar is fastened below the shaft to the two vertical members so as to force the cylindrical rods from the innermost cylindrical portion of the claw-like hands as the cart is placed in a horizontal position.

It is one object of the present invention to provide an apparatus for lifting and rotating a cart in such a manner so as to cause the contents to fall from the cart without requiring manual attachment of the apparatus to the cart. Related objects and advantages of the present invention will be further evident from the drawings and following description.

DESCRIPTION OF THE PREFERRED EMBODIMENT

Figure 1:
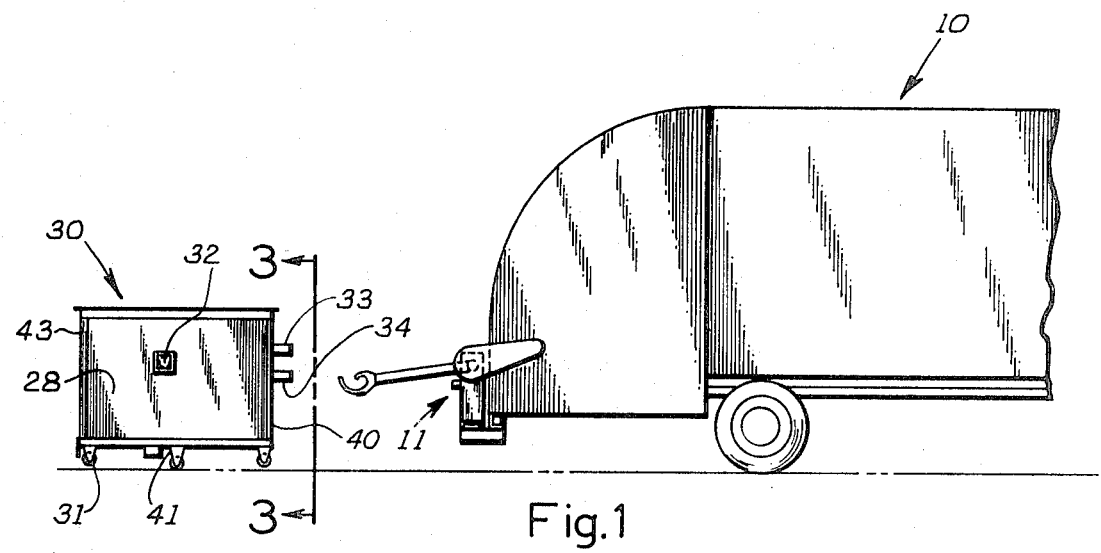
FIG. 1 is a side view of a truck for receiving refuse from a refuse cart.
Figure 2:
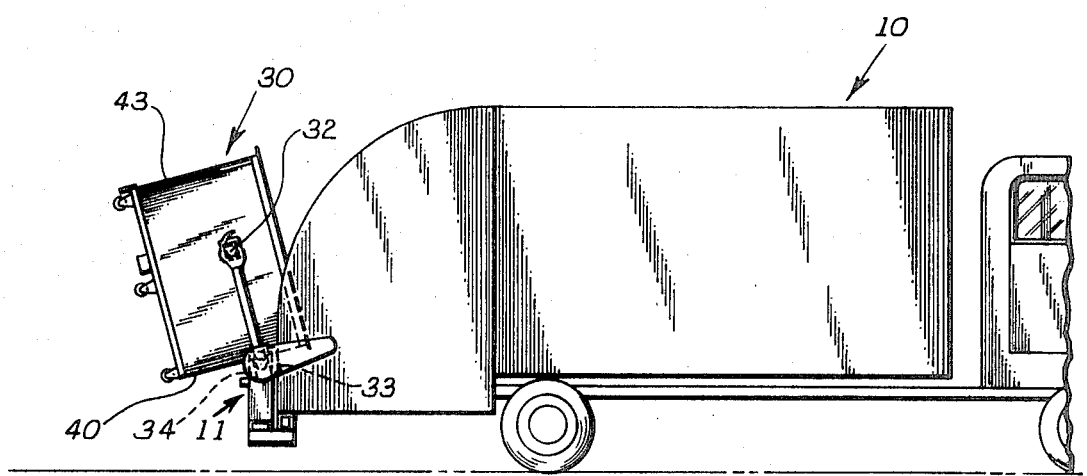
FIG. 2 is the same view as FIG. 1 with the refuse apparatus of the truck lifting the refuse cart in order that the refuse may fall into the truck.

Referring more particularly to FIG. 1, there is illustrated a truck 10 having a dumping apparatus 11 for receiving and lifting cart 30. Cart 30 is a five-sided container with a top opening for receiving refuse, such as garbage and trash. Cart 30 has roller wheels 31 mounted by brackets 41 in order that the cart may be moved from place to place. Mounted to cart 30 are handles and projections for the claw-like hands of the dumping apparatus 11 to grasp and lift as shown in FIG. 2.

Figure 3:
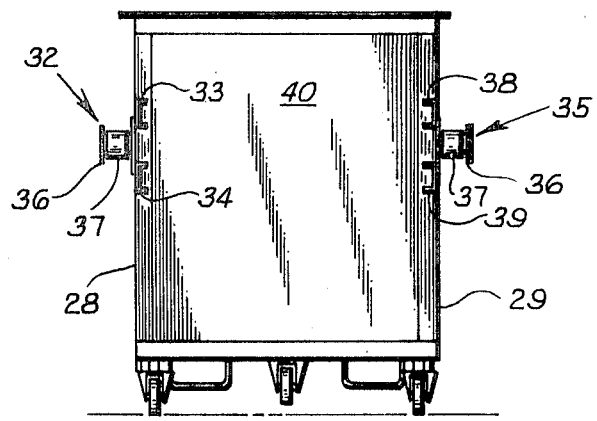
FIG. 3 is an end view of the refuse cart depicted in FIG. 1 taken in the direction of arrows 3—3.

FIG. 3 is an end view of cart 30 taken in the direction of arrows 3—3 of FIG. 1. Mounted to side walls 28 and 29 of cart 30 are handles 32 and 35 for receiving the claw-like hands of dumping apparatus 11. The handles are identical having a cylindrical bar 37 with a hub 36 mounted to the end of the bar to prevent the claw-like hands of the dumping apparatus from slipping off the end of the cylindrical bar. Mounted to wall 40, nearest truck 10, are four projections 33, 34, 38 and 39 for engagement with dumping apparatus 11 as will be more evident after the dumping apparatus is described.

Figure 4:
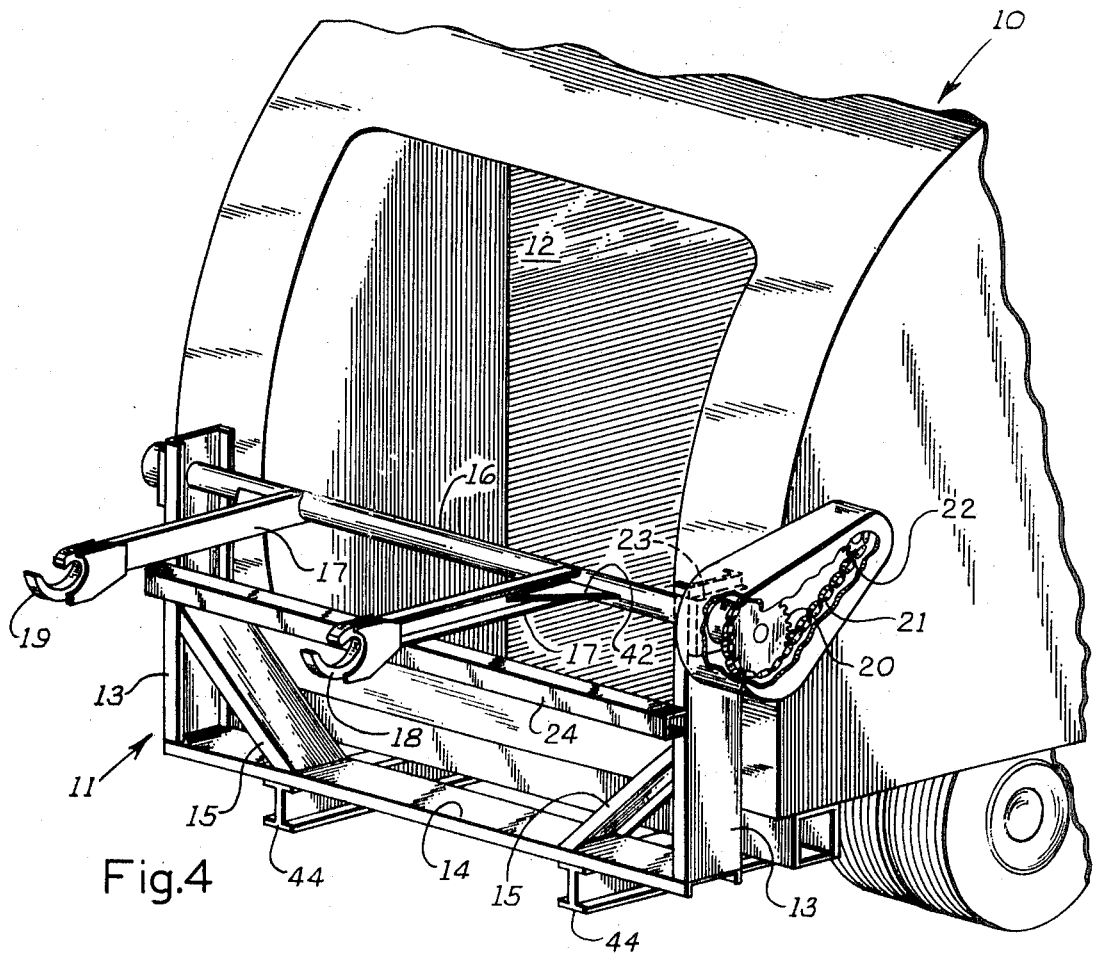
FIG. 4 is a fragmentary perspective end view of the truck depicted in FIG. 1 showing more particularly the dumping apparatus.

FIG. 4 is a fragmentary perspective end view of the back portion of truck 10 with dumping apparatus 11 attached. The frame of the dumping apparatus is composed of two vertical members 13 fastened to horizontal member 14 and being supported by members 15. Member 14 is fastened to truck I-beams 44. All of these members may be welded together or fastened together by means of bolts or other suitable fastening devices. The frame of the dumping apparatus supports a cylindrical shaft 16 which is rotatably mounted to the top of members 13. Shaft 16 extends through mounting brackets 23 attached to the upper portion of the two vertical members 13. Bracket 23 has bearings provided therein to facilitate free rotation of shaft 16. Rotation of shaft 16 causes the two claw-like hands 18 and 19 to rotate upward in such a manner that cart 30 is lifted and rotated, allowing the refuse within the cart to fall into truck 10 through opening 12. Rotation is imparted to shaft 16 by means of a chain sprocket drive mounted at one end of the shaft. Fixedly fastened to shaft 16 is sprocket 20 which receives chain 21. Chain 21 may be driven by a sprocket 22 attached to an axle motor mechanism not shown. The sprocket chain apparatus illustrated is only one of many possible devices which could be used to impart rotation to shaft 16. Fixedly fastened to shaft 16 are two arms 17 with claw-like hands 18 and 19 mounted at either end. Arms 17 are fastened to shaft 16 by welding the arms to the shaft and by fastening a triangular shaped flange 42 to the arms and shaft providing stability to the arms. The claw-like hands may also be welded to the ends of arms 17.

Figure 5:
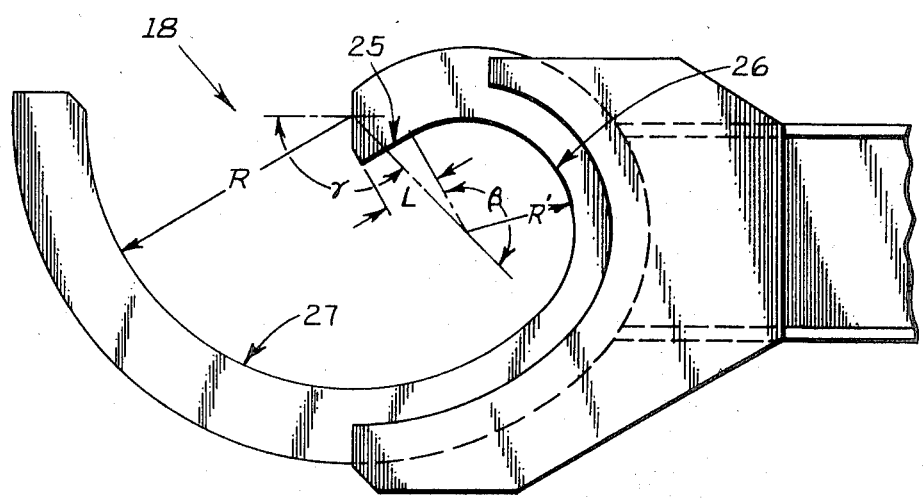
FIG. 5 is an enlarged side view of the claw-like hand of the dumping apparatus depicted in FIG. 4.

FIG. 5 shows an exploded view of one of the claw-like hands. Both hands are identical having an opening 18 for automatically receiving rod 37. Each hand has an outermost cylindrical surface defined by radius R through angle $\gamma$ and an innermost cylindrical surface defined by radius R' through angle $\beta$. A flat surface is located at the top innermost portion of the hand having a length L. These surfaces provide a seating for cylindrical rods 37 of cart handles 32 and 35.

The operation of hands 18 and 19 in relation to handles 32 and 35 will be more clearly understood by referring to FIGS. 2 and 4. As the truck is backed into position, hands 18 and 19 are positioned adjacent to the side wall 28 and 29 of the cart. The shaft is rotated in such a manner that the outermost cylindrical portion of the two hands, defined by R and $\gamma$, engage the cylindrical rod 37 of the two cart handles 32 and 35. At the same time, the four projections 33, 34, 38 and 39 straddle shaft 16 and in conjunction with handles 32 and 35 allow the cart to be lifted and tilted causing the refuse within the cart to dump through the truck opening 12. As the cart is lifted, the cylindrical handle rod 37 rotates into the innermost cylindrical portion of the hand defined by R' and $\beta$. Projections 33, 34, 38 and 39 are located on the forward cart wall 40 so that the two top projections 33 and 38 rest near the top surface of shaft 16 and the two bottom projections 34 and 39 rest near the bottom of shaft 16. As shaft 16 is rotated, causing hands 18 and 19 to lift the cart as shown in FIG. 2, the inner cylindrical portion 26 of the two hands in conjunction with the flat portion 25 of the two hands prevent the two handles from disengaging the hands. After the refuse is dumped the shaft is rotated in the opposite direction until the cart is once again in a horizontal position. A horizontal bumper bar 24, shown in FIG. 4, is fastened between the two vertical members 13 of the dumping apparatus 11 to facilitate automatic disengagement of the hands from the two handles. As the hands move downward, the cylindrical handle rods 37 tend to stay within the innermost cylindrical portion 26 of the two hands. Thus, bumper bar 24 will abut against the forward cart wall 40 thereby forcing the two handle rods 37 into the outer cylindrical portion 27 of the two hands. When the cart does finally reach the horizontal position, it is properly located so that arms 17 and hands 18 and 19 continue to move downwardly.

Handles 32 and 35 are located between the center of the cart and the back wall 43 of the cart in order that the center of gravity of the cart may be between the cart handles and the truck providing greater stability. The arms attaching the claw-like hands to the shaft of the dumping apparatus must be of suitable length to enable the claw-like hands to engage the two handles while at the same time allowing the four projections located on the front wall of the cart to straddle the shaft of the dumping apparatus. Likewise, the four projections must be located on the front wall of the cart in such a manner that they will straddle the shaft of the dumping apparatus when the truck is backed into position. The claw-like hands may be shaped in many different ways. One embodiment of the present invention has the claw-like hands dimensioned as follows:

| | |
|---|---|
| R | 3¾ inches |
| R' | 1½ inches |
| γ | 135 degrees |
| β | 150 degrees |
| L | ⅞-inch |

Of course, it is understood that these dimensions are typical and many variations of the dimensions of the hand are possible and included in this invention. In addition, the dumping apparatus may be attached to the frame of any type of vehicle or may be placed on the ground, floor of a building, or other similar place.

It will be evident from the above description that the present invention provides an apparatus for quickly and easily lifting a cart in such a manner so as to cause the contents of the cart to fall from the cart without requiring manual attachment of the device to the cart. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be protected.

The invention claimed is:

1. A material dumping arrangement comprising:
   a cart for receiving and holding material;
   a dumping apparatus having a first extension and a shaft interconnected for lifting said cart and allowing said material to fall from said cart, said extension having means for automatically engaging said cart;
   a first handle attached to a first side wall of said cart for engaging said first extension;
   a first projection mounted to a second end wall of said cart nearest said dumping apparatus;
   a second projection mounted to said second end wall of said cart, said first and second projection being located to straddle said shaft; and wherein:
   the center of gravity of said cart is located between said handle and the attached dumping apparatus; and,
   said first extension is fixedly fastened to said shaft rotatably mounted and driven in said apparatus.

2. The dumping arrangement of claim 1 wherein said first extension has a first hand fastened to its end for engaging said first handle, said first handle having a cylindrical rod for fitting in said first hand.

3. The dumping arrangement of claim 2 wherein said first hand is shaped like a claw with an opening for receiving said rod of said first handle and an inner cylindrical portion for holding said rod as said cart is lifted.

4. The dumping arrangement of claim 3 additionally comprising: a bumper bar fastened below said shaft to force said rod out of said inner cylindrical portion as said dumping apparatus places said cart in a horizontal position.

5. The dumping arrangement of claim 4 wherein said first handle has a hub fastened to said rod preventing said first hand from slipping off the end of said rod.

6. The dumping arrangement of claim 5 additionally comprising:
   a second handle identical in shape to said first handle located on a second sidewall parallel and opposite of said first side wall of said cart;
   a second extension identical in shape to said first extension being fastened to said shaft and having a second hand, said second hand identical in shape to said first hand for engaging said second handle, said first and second hand operating cooperatively to lift said cart.

* * * * *